United States Patent

[11] 3,572,009

| [72] | Inventors | Elza I. Cheshire;<br>Mae M. Cheshire, 5602 N. Walton St.,<br>Pensacola, Fla. 32503 |
|---|---|---|
| [21] | Appl. No. | 888,065 |
| [22] | Filed | Dec. 24, 1969 |
| [45] | Patented | Mar. 23, 1971 |

[54] EXHAUST EMISSION CONTROL COMPOSITION
3 Claims, No Drawings

| [52] | U.S. Cl. | 55/84 |
|---|---|---|
| [51] | Int. Cl. | B01d 47/00 |
| [50] | Field of Search | 23/2.2;<br>55/84, 228 (E.I.); 60/30 |

[56] References Cited
UNITED STATES PATENTS

| 2,975,586 | 3/1961 | Braz | 60/30 |
|---|---|---|---|
| 3,032,968 | 5/1962 | Novak et al. | 60/30 |
| 3,353,336 | 11/1967 | Caballero | 55/228 |

*Primary Examiner*—Samih N. Zaharna
*Assistant Examiner*—R.W. Burks
*Attorneys*—Clarence A. O'Brien and Harvey B. Jacobson

ABSTRACT: An exhaust emission control composition which contains borax, baking soda and water.

3,572,009

EXHAUST EMISSION CONTROL COMPOSITION

BACKGROUND OF THE INVENTION

This invention relates to a composition which minimizes the emission of exhaust irritants into the atmosphere. More particularly, this invention relates to an aqueous solution of borax and baking soda for use with automobiles.

Air pollution and the lack of clean air is now one of the pressing problems of this age. The great amount of impurities which is being poured daily into the air by exhaust gases of industrial processes or from the many automobiles now in use throughout the world is slowly poisoning people, thus impairing their ability to lead healthy and long lives. This problem is particularly acute in the cities where the population is dense. Various solutions have been proposed to solve this problem with respect to exhaust gas from automobiles. For example, it has been suggested to reburn the gas, thus avoiding the formation of carbon monoxide, a poisonous product. Another solution is the use of a device such as that described in U.S. Pat. No. 3,353,336 which sprays the exhaust gas with an aqueous solution of sodium lauryl sulfate, borax, chlorophyl A and trisodium phosphate. However, this composition is not easily vaporizable due to the soap which after contacting the gas leaves a residue that must be removed from the combustion engine.

SUMMARY OF THE INVENTION

Accordingly, it is an object of this invention to provide a composition which will minimize the emission of irritants from an exhaust stream of a combustion engine.

Another object of the invention is to provide a composition which easily vaporizes within a combustion engine.

These and other objects will become apparent as the description proceeds.

DESCRIPTION OF THE PREFERRED EMBODIMENTS

According to the present invention, it has been discovered that an aqueous solution of borax and baking soda will minimize the emission of irritants into the air.

This composition can be easily formed as its elements are readily available. All the invention requires is the use of borax (or $Na_2B_4O_7$), baking soda (or $NaHCO_3$) and water.

A formulation, according to the invention, comprises 2 pounds of water, pure baking soda and 2 pounds of pure borax added to 30 gallons of water. This solution is then injected into the exhaust manifold of a car as the engine is running by means of ⅛-inch stainless steel pipe having a ⅛-inch needle valve. Approximately a gallon of gas is used by the engine during injection of approximately one-half gallon of solution.

Without limiting the scope of the invention, it is presently believed that the beneficial results obtained by the invention take place as follows: The borate-bicarbonate solution vaporizes into a steam when it comes into contact with the hot manifold or heated exhaust gas, and the steam acts to cleanse the exhaust gas by removing some of the carbon and carbon products before the gas is emitted into the air. The principle by which the irritants in the gas are minimized is not fully understood and most likely consists of a cleaning and absorption process. However, it is not intended that this invention be limited to any specific theory of operation.

The amounts of soda, borax, and water to be used in accordance with the invention is not limited to that previously described in the preferred embodiment but can be any amounts which reflect approximately the same ratio; namely, 1 pound: 1 pound: 15 gallons. The amount of solution injected into the manifold will depend on the horsepower of the motor; however, it should not exceed the amount of gasoline consumed by the motor. Although the invention is described only with reference to a single manifold, it is equally operable with two and, therefore, is applicable to cars having dual exhaust systems.

It will be understood by those skilled in the art that various modifications can be made of this invention without departing from the scope of the invention.

We claim:

1. An aqueous composition for minimizing the emission of irritants into the atmosphere in combustion engine exhaust which consists of $Na_2B_4O_7$ and $NaHCO_3$.

2. A composition according to claim 1 in which the $Na_2B_4O_7$, $NaHCO_3$ and water are present in approximately a 1 pound: 1 pound: 15 gallon ratio.

3. A method for minimizing the emission of irritants from an exhaust system of a combustion engine which comprises the steps of:
   a. forming an aqueous solution of $Na_2B_4O_7$ and $NaHCO_3$; and
   b. injecting said solution into the exhaust manifold as said engine is running so that said solution vaporizes when it comes into contact with the heated manifold and the heated gas and forms a steam which acts to clean said exhaust gas.